US006841973B2

(12) United States Patent
Bernardon et al.

(10) Patent No.: US 6,841,973 B2
(45) Date of Patent: Jan. 11, 2005

(54) DC-DC CONVERSION CHARGING APPARATUS

(75) Inventors: Derek Bernardon, Villach (AT); Alberto Flore, Villach (AT)

(73) Assignee: Infineon Technologies AG, München (DE)

( * ) Notice: Subject to any disclaimer, the term of this patent is extended or adjusted under 35 U.S.C. 154(b) by 0 days.

(21) Appl. No.: 10/682,219

(22) Filed: Oct. 9, 2003

(65) Prior Publication Data

US 2004/0145351 A1 Jul. 29, 2004

Related U.S. Application Data

(63) Continuation of application No. PCT/EP01/04860, filed on Apr. 30, 2001.

(51) Int. Cl.[7] ........................ H01M 10/44; H01M 10/46
(52) U.S. Cl. ........................................................ 320/139
(58) Field of Search ............................... 320/127, 128, 320/139, 140

(56) References Cited

U.S. PATENT DOCUMENTS

| 5,307,004 | A | | 4/1994 | Carsten ...................... 323/222 |
| 5,537,074 | A | * | 7/1996 | Iversen et al. ............... 327/564 |
| 5,610,499 | A | | 3/1997 | Rogers ......................... 322/25 |
| 5,638,265 | A | * | 6/1997 | Gabor ........................... 363/89 |
| 5,760,568 | A | * | 6/1998 | Naskali ....................... 320/139 |
| 5,815,382 | A | | 9/1998 | Saint-Pierre et al. ........... 363/21 |
| 5,969,962 | A | * | 10/1999 | Gabor ........................... 363/89 |
| 5,986,430 | A | | 11/1999 | Fernandez et al. ........... 320/106 |
| 5,994,878 | A | | 11/1999 | Ostergaard et al. ......... 320/132 |

FOREIGN PATENT DOCUMENTS

| EP | 0 762 594 A1 | 12/1997 |
| WO | 94/19860 | 9/1994 |

OTHER PUBLICATIONS

International Search Report PCT/EP01/04860 dated Jan. 2002.*

* cited by examiner

*Primary Examiner*—Edward H. Tso
(74) *Attorney, Agent, or Firm*—Jenkins, Wilson & Taylor, P.A.

(57) ABSTRACT

The present invention provides a method of charging a rechargeable device (108) and a charging apparatus wherein the rechargeable device (108) is connected to a battery connection port (107) and ground (106), an external DC source having an input voltage (114) is connected to an input resistor (101) of a charging apparatus, a current reference value (109) and a voltage reference value (110) are fed to a control unit (104), a duty cycle (d) is determined in accordance with the current reference value (109) and the voltage reference value (110) fed to the control unit (104), and, using the duty cycle (d), an output voltage (402, 403) applied to the rechargeable device (108) is switched between a minimum output voltage (404) and a maximum output voltage (405) dependent on the current reference value (109) an the voltage reference value (110) by means of a charging switch (103).

9 Claims, 4 Drawing Sheets

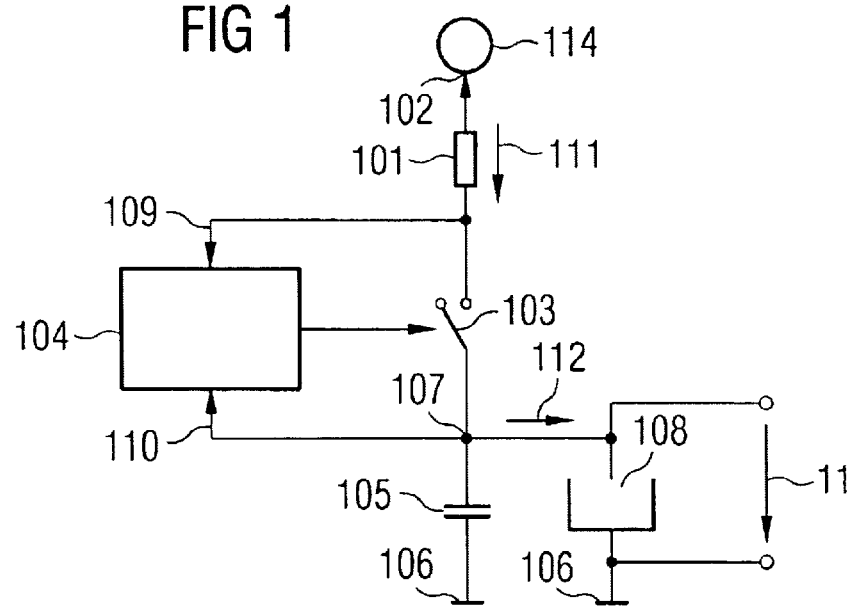
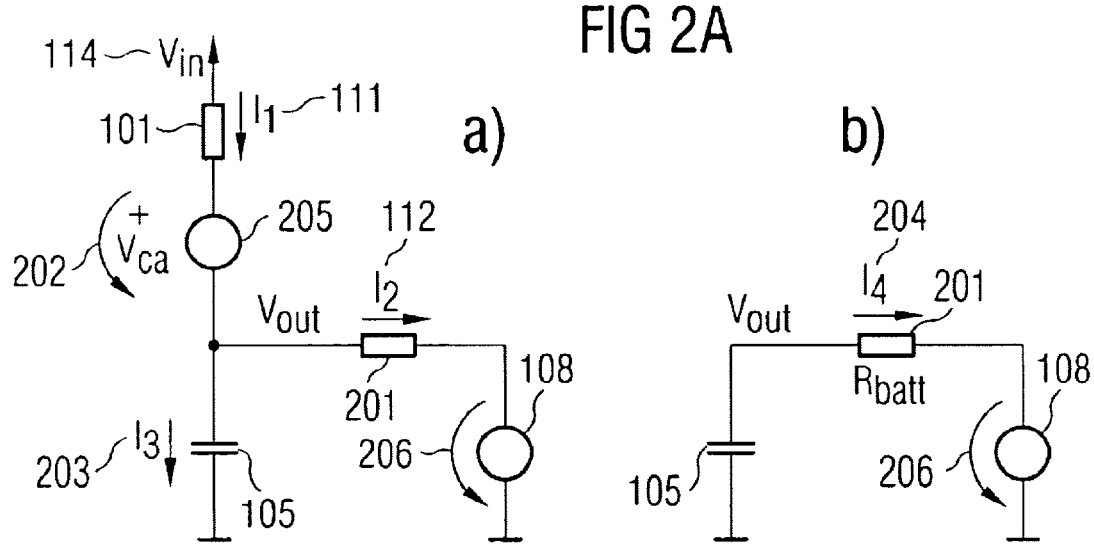

FIG 3
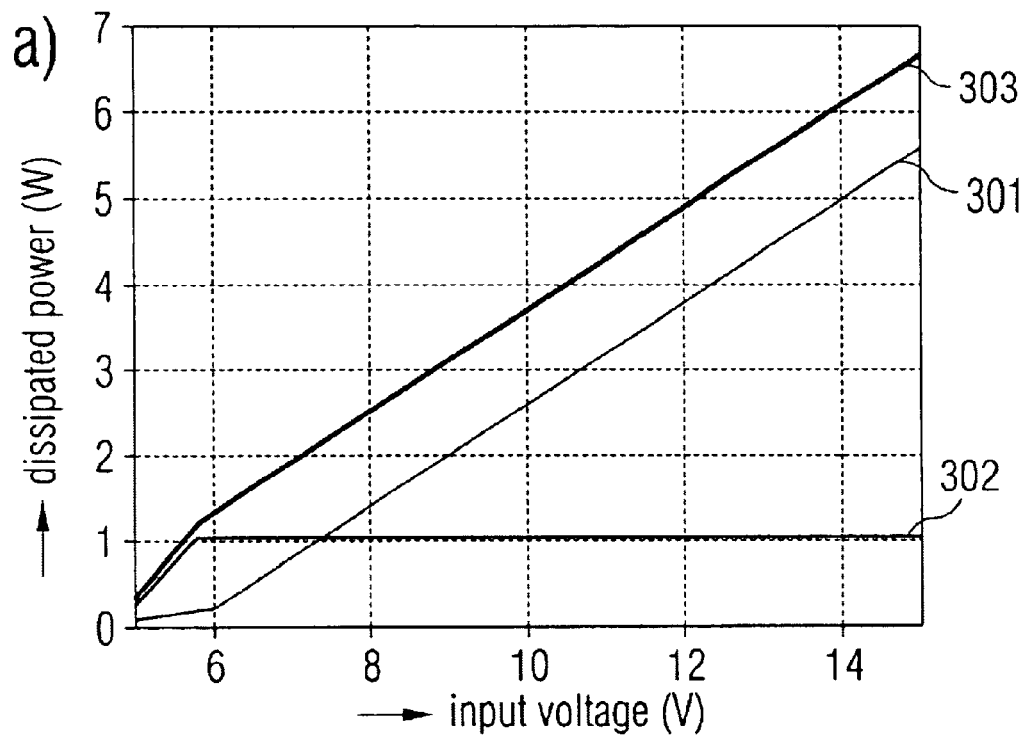
a)
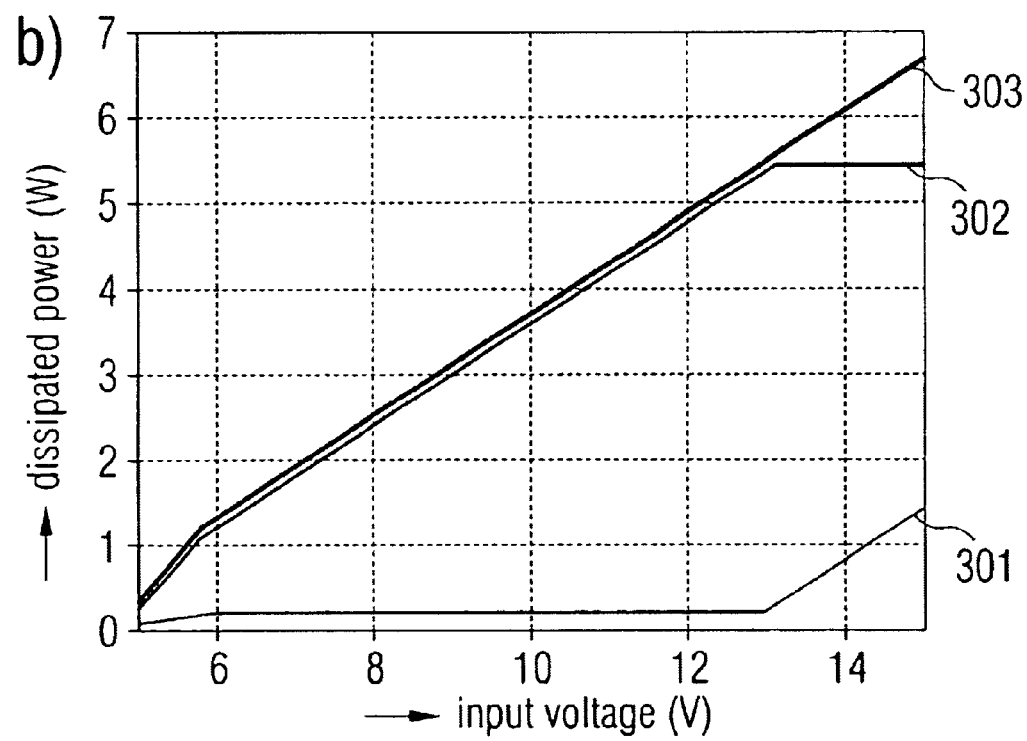
b)

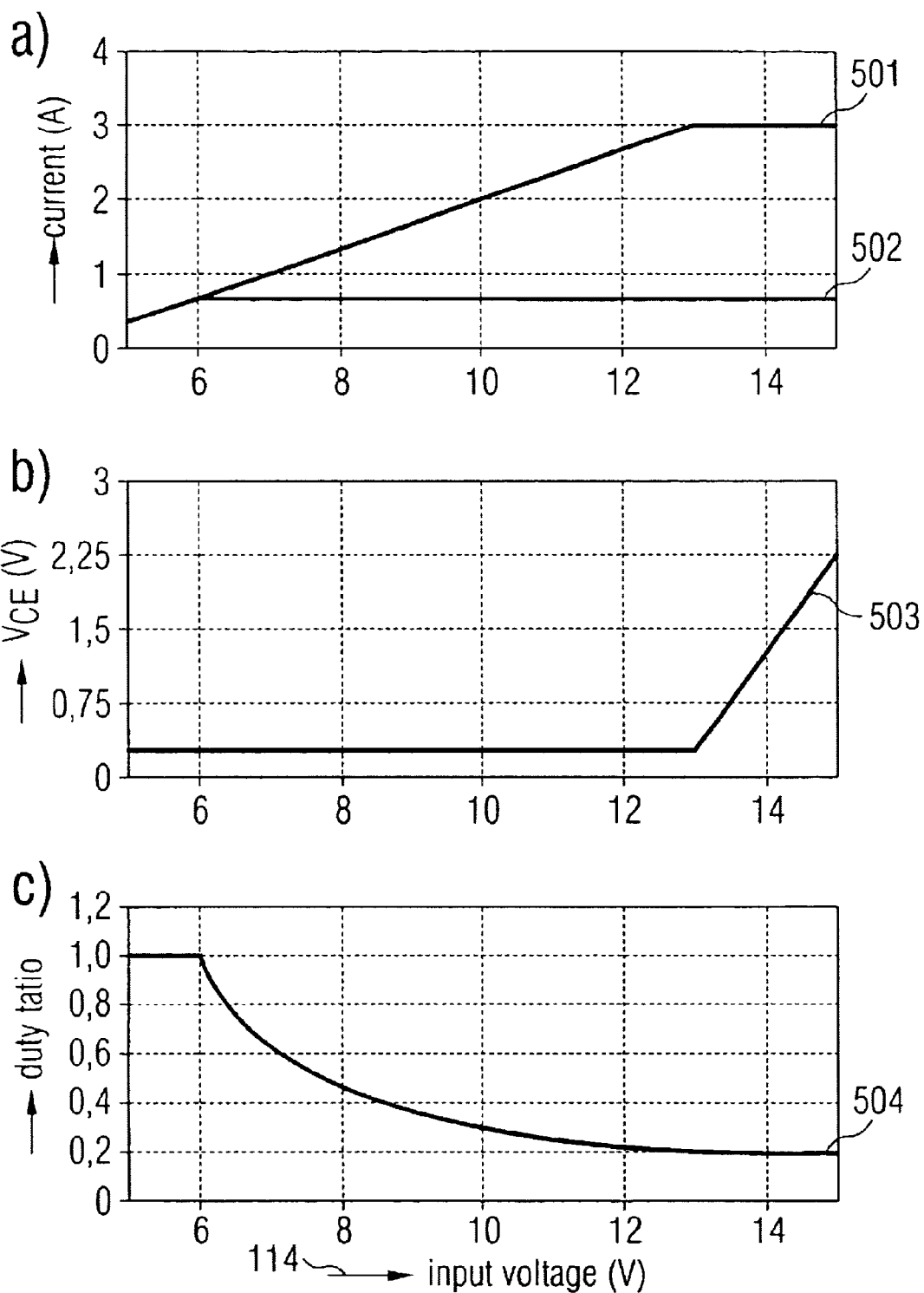

DC-DC CONVERSION CHARGING APPARATUS

RELATED APPLICATIONS

This application is a continuation of PCT patent application number PCT/EP01/04860, filed Apr. 30, 2001, the disclosure of which is incorporated herein by reference in its entirety.

TECHNICAL FIELD

The present invention relates to DC-DC (direct current-direct current) converters, and particularity to DC-DC converters using RC filters.

BACKGROUND ART

DC-DC converters have been described in detail in e.g. "Daniel M. Mitchell, *DC-DC Stitching Regulator Analysis*, McGraw Hill 1988".

The converters are commercially available, e.g. from HN Electronic Components GmbH, Langenselbold, and the function thereof is readily explained. Furthermore DC-DC converters are available from Technoproject, as described in "http://www.techno-project.de". Presently DC-DC converters are used for many applications, e.g. in combination with electric charging apparatuses for mobile phones.

Energy management is one of the fundamental problems in a project of portable, electronic devices. This problem pertains all the elements that make a device portable and affects service, time of utilizability, size and weight of the same.

Conventional charging apparatuses employ linear regulators, where a power transistor is integrated in the charging apparatus and the regulator requires a regulated external AC-adapter having a very accurate output voltage such that the voltage drop across the power transistor is reduced and the power dissipation is maintained within acceptable values.

A major disadvantage of commonly used AC-adapters (AC=alternating current, connector) is the high cost. In many applications unregulated AC-adapters are widely used whereby AC-adapters contain DC-DC-converters, such that the output voltage is continuous.

A further disadvantage of unregulated adapters is that they do not have a feed-back loop maintaining the output voltage constant resulting in a much greater load-dependant output voltage.

Another disadvantage is that the power dissipation is high such that it is in many cases not possible to integrate the power transistor.

This leads to the further disadvantage, that the power transistors has to be installed externally and a charging current has to be reduced.

Another version of an AC-adapter consists of a small transformer with a diode bridge that produces a half wave rectified waveform. The diode bridge is followed by a PTC resistor (positive temperature coefficient), which is installed in order to limit the maximum current towards a load, e.g. a mobile phone, whereby the mobile phone contains an integrated power transistor, which is connected in a diode configuration. The major disadvantage of this design is that the charging time is considerably increased.

Another state-of-the-art arrangement is a DC-DC converter, which has a very high efficiency and which can be used with both regulated and unregulated DC-DC converter-AC-adapters. An advantage of this configuration is, that it has an internal current limitation permitting a direct connection of the mobile phone to a car battery. Due to the high efficiency the power transistor can be integrated. A major disadvantage of this configuration is the cost and size of an inductance coil necessary for this setup.

A further conventional setup uses pulsed charging requiring an external AC-adapter, which must contain a DC-DC converter with current limitation. In this configuration the power transistor functions as a charging switch at very low frequencies, e.g. in the range of 0.1–10 Hz. The major disadvantage of this configuration is, that there is a possibility, that voltage peaks exceed the maximum voltage defined for e.g. Lithium Ion batteries by the production process. Nevertheless this type of charging is highly efficient permitting the power transistor to be integrated. The configuration requires no external components and can be adapted to a large variety of adapters.

One major disadvantage of the pulsed charging configuration is that this design requires a change in a circuit configuration in order to adapt a specific AC-adapter. A further disadvantage is that an external diode is required. Yet a further disadvantage is, that battery producers have not yet given an "OK" for using voltages greater that the one specified.

SUMMARY OF THE INVENTION

It is therefore an object of the present invention, to provide a DC-DC converter, which does not exhibit the disadvantages of the state of the art devices.

This object is achieved by the design of a DC-DC converter employing a RC (resistor-capacitor) filter in accordance with claim 1.

It is an advantage of the present invention that a charging apparatus is provided, which operates in conjuction with multiple types of AC-adapters or directly with a battery or another rechargeable device.

The method of charging a rechargeable device (108) according to the present invention comprises essentially the following steps:

a) connecting the rechargeable device to a battery connection port and ground;

b) connecting an external DC source having an input voltage in a specified range, e.g. 6 volts to 14 volts, to an input resistor of a charging apparatus;

c) feeding a current reference value obtained from the charging apparatus to the control unit;

d) feeding a voltage reference value obtained from the charging apparatus to the control unit;

e) determining a duty cycle in accordance with the current reference value and the voltage reference value fed to the control unit;

f) switching, using the duty cycle, an output voltage applied to the rechargeable device between a minimum output voltage and a maximum output voltage dependent on the current reference value an the voltage reference value by means of a charging switch; and g) disconnecting the charged rechargeable device from the charging apparatus.

In accordance with one aspect of the present invention a filter consisting of a resistor and a capacitor, i.e. a RC filter is provided as a filter unit.

In accordance with another aspect of the present invention the resistance is installed separately from the charging apparatus. In the circuit design according to the present invention this is a major advantage, as most of the power is dissipated by the resistor.

Another advantage is, that commonly used schemes can be connected to a car battery, and a car adapter could be used as an inexpensive resistor.

In accordance with another aspect of the present invention the circuit design is adapted to avoid voltages above a voltage as specified for the use with Lithium Ion batteries.

In accordance with another aspect of the present invention a soft switching is provided in order to avoid electromagnetic interference problems.

In accordance with another aspect of the present invention the power generated by the charging apparatus is essentially dissipated outside the charging apparatus.

The charging apparatus for charging a rechargeable device according to the present invention includes:

a) a battery connection port for connecting the rechargeable device to the charging apparatus;

b) an input resistor for connecting an external DC source having an input voltage to the charging apparatus;

c) a control unit for the determination a duty cycle in accordance with a current reference value and a voltage reference value fed to the control unit; and d) a charging switch for switching, according to the duty cycle, an output voltage applied to the rechargeable device between a minimum output voltage and a maximum output voltage dependent on the current reference value and the voltage reference value (110).

BRIEF DESCRIPTION OF THE DRAWINGS

Embodiments of the present invention are depicted in the drawings and are explained in more detail in the following description.

FIG. 1 is a circuit diagram of an embodiment according to the present invention;

FIG. 2(a) is a circuit diagram showing a configuration of the circuit corresponding to a period of time when the switch is ON;

FIG. 2(b) is a circuit diagram showing a configuration of the circuit corresponding to a period of time when the switch is OFF;

FIG. 3(a) is a graph showing the total dissipated power (fat line), the power dissipated by aa input resistor, shown in FIG. 2(a), (medium line) and the power dissipated by the transistor (thin line) as a function of the input voltage for a conventional linear regulator;

FIG. 3(b) is a graph showing the total dissipated power (fat line), the power dissipated by a input resistor, shown in FIG. 2(a), (medium line) and the power dissipated by the transistor (thin line) as a function of the input voltage for a DC-DC converter with RC filter according to an embodiment of the present invention;

FIG. 5(a) is a graph showing the instantaneous current (fat line) and the average current (thin line) as a function of the input voltage according to an embodiment of the present invention;

FIG. 5(b) is a graph showing the voltage drop at the transistor as a function of the input voltage according to an embodiment of the present invention; and FIG. 5(c) is a graph showing the duty ratio as a function of the input voltage according to an embodiment of the present invention.

DETAILED DESCRIPTION OF THE INVENTION

Figure 4:
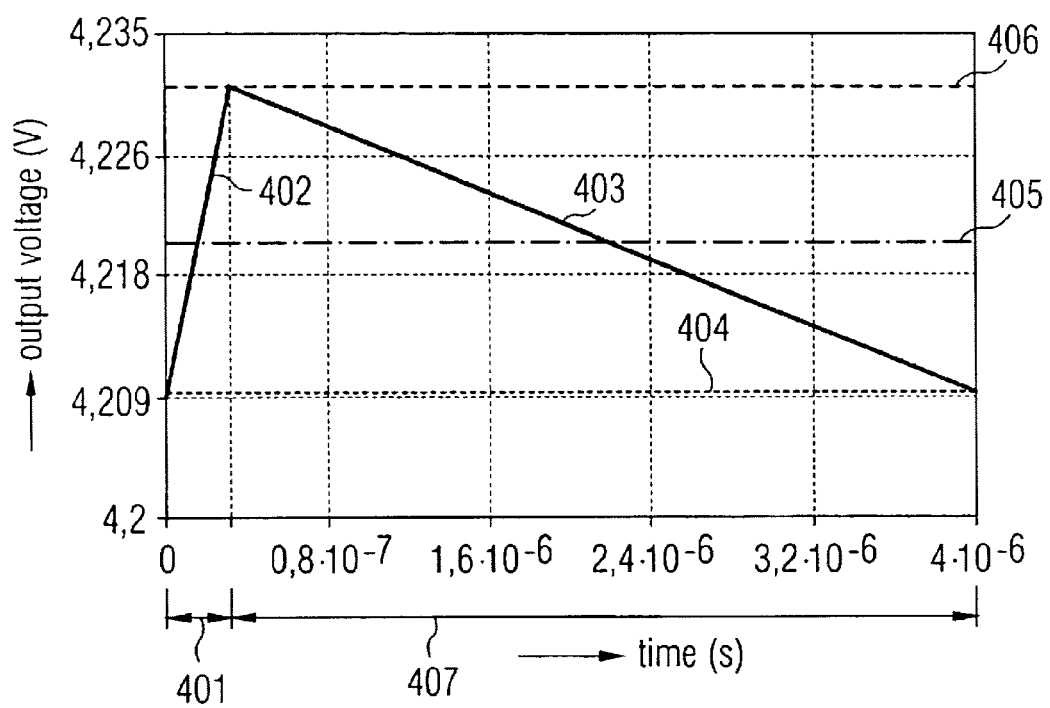
FIG. 4 is a graph showing the variation of the output voltage as a function of time for the two cases shown in FIGS. 2(a) and (b)

In the circuit diagram shown in FIG. 1, an input resistor 101 is connected to a power supply port 102. The second terminal of the input resistor 101 is connected to a charging switch 103 and a control unit 104. The second terminal of the charging switch 103 is connected to a second terminal of the control unit 104 and to the first terminal of a charging capacitor 105. The second terminal of the charging capacitor 105 is connected ground 106. The connection between the second terminal of the charging switch 103 and the first terminal of the charging capacitor 105 is designated as the battery connection port 107, to which the first terminal of the battery, i.e. the rechargeable device 108 is connected.

The operation of the charging apparatus shown in FIG. 1 is described as follows. The control unit 104 is provided with current reference value 109 from the second terminal of the input resistor 101 and with voltage reference value 110 from the battery connection port 107.

In accordance with the provided current reference value 109 and the provided voltage reference value 110 the control unit 104 operates the charging switch 103 which, when closed, then transports the switched current 111. Thus, a charging current 112 is provided to the battery 108 through a path connecting the battery connection port 107 and the first terminal of the battery 108, whereby the second terminal of the battery 108 is connected to ground 106. A charging voltage 113 is measured between the battery connection port 107 and ground 106 as an indication of the charging state of the battery.

FIGS. 2(a) and 2(b) represent configurations of the circuit of FIG. 1 at the period the charging switch 103 is ON (FIG. 2(b)) and at the period the charging switch 103 is OFF (FIG. 2(b)), respectively. FIG. 2(a) is a circuit diagram showing a configuration of the circuit corresponding to a period when the switch is ON and FIG. 2(b) is a circuit diagram showing a configuration of the circuit corresponding to a period when the switch is OFF.

Referring to FIG. 2(a), an input voltage 114 is provided by the AC-adapter from the car battery. A transistor voltage drop 202 is added to the voltage drop across the input resistor 101 caused by the switched current 111 ($I_1$) whereby the transistor voltage drop 202 is designated as VCE. The charging current 112 ($I_2$) causes a voltage drop across a battery resistor 201, whereby the switched current 111 ($I_1$) is divided into the charging current ($I_2$) and the charging capacitor current 203 ($I_3$).

In a first phase of the cycle there is a high current flowing through the input resistor 101 into the charging capacitor 105 and partially into the battery 108. In a second phase, as shown in FIG. 2(b), a secondary charging current 204 ($I_4$) flows from the charging capacitor 105 into the battery 108. The current through the battery is therefore filtered by an RC-filter represented by the charging capacitor 105 (C) and the battery resistor 201 (R).

A control loop acts on a duty cycle of the control unit 104 controlling an average current and an average voltage. A power dissipation $P_R$ in the battery resistor 201 is calculated from the following equation:

$$P_R = (R_{sense} \cdot I_{ist}^2) \cdot d$$

with d being the duty cycle, $R_{sense}$ being the value of the input resistor 101 and $I_{ist}$ being an instantaneous current flowing through the input resistor 101. The power dissipation $P_T$ in the transistor is obtained from the following equation:

$$P_T = (V_{CE} \cdot I_{ist}^2) \cdot d$$

with $V_{CE}$ being the transistor voltage drop 202 across the collector-emitter path of the transistor 205. Thus a total power dissipation $P_{tot}$ can be written as:

$$P_{tot} = P_R + P_T$$

A linear regulator with the same charging current 112 compares with the regulator according to the preferred embodiment of the present invention as follows:

$$P_{lin} = (V_{in} - V_{batt}) \cdot I_{avg},$$

where $I_{avg}$ is the average charging current 112, $V_{in}$ is the input voltage 114 and $V_{batt}$ is the voltage across the battery terminals, i.e. the battery voltage 206. The dissipated power is distributed among the input resistor 101 and the transistor 205 as follows:

$$P_{Rlin} = R_{sense} \cdot I_{media}^2$$

$$P_T = (V_{in} - V_{batt} - R_{sense} \cdot I_{media}) \cdot I_{media}$$

With $I_{media}$ being an average current through the input resistor 101.

As shown in FIGS. 3(a) and (b), a variation in the input voltage 114, here shown as a variation from six volts to fourteen volts representing an example of a typical car supply voltage (car battery voltage), results in different variations of the power that is distributed among the input resistor 101 and the transistor 205.

As shown in FIG. 3(b) the power dissipated by the transistor 205, illustrated by the thin lines 301 is much less than in FIG. 3(a) where the situation of a conventional conventional linear regulator is depicted. The medium lines 302 in FIGS. 3(a) and 3(b) give the power dissipated by the input resistor 101, whereas the total power dissipated is represented by the thick lines 303.

Thus it will be appreciated that due to the reduced power 301 dissipated by the transistor 205, as shown in FIG. 3(b), the transistor 205 can be integrated into a charging unit in a preferred embodiment of the present invention.

Hereinafter, as shown in FIG. 4, the output voltage ripple is calculated for both cases shown in FIGS. 2(a) and (b), whereby the output voltage 402 for the first case, i.e. during ON time 401, is given by the following equations:

$$V_{out}(t) = A + C \cdot \exp(-(t/\tau_{on}))$$

With the expression $$\tau_{on} = (R_{sense} // R_{batt}) \cdot C_{out}$$

and the expressions for A and C being $$A = \left( \frac{V_{in} - V_{CE}}{R_{sense}} + \frac{V_{batt}}{R_{batt}} \right) \cdot \left( \frac{R_{batt} \cdot R_{sense}}{R_{sense} + R_{batt}} \right)$$

$$C = (B - A + D) \exp(t / \tau_{on}).$$

The output voltage 403 for the second case, i.e. during OFF time 407, is given by the following equations:

$$V_{out}(t) = B + D \exp(t/\tau_{off})$$

with the expression for $$\tau_{off} = R_{batt} \cdot C_{out}$$

and the expressions for A and B being $$A = \left( \frac{V_{in} - V_{CE}}{R_{sense}} + \frac{V_{batt}}{R_{batt}} \right) \cdot \left( \frac{R_{batt} \cdot R_{sense}}{R_{sense} + R_{batt}} \right)$$

$$B = V_{batt}$$

Thus it can be seen that the output voltages 402 and 403, respectively, varie between a minimum output voltage 404 and a maximum output voltage 406, whereby an average output voltage 405 is obtained, as shown in FIG. 4.

In FIGS. 5(a) to (c) an instantaneous current 501 and and avarage current 502, a transistor voltage drop 503 and a duty ratio 504 are depicted as a function of the input voltage 114.

While preferred embodiments have been shown and described, various modifications and substitutions may be made thereto without departing from the spirit and scope of the invention. Accordingly it is to be understood that the present invention has been described by way of illustration and not limitation.

| List of Reference Numerals | |
|---|---|
| 101 | Input resistor $R_{sense}$ |
| 102 | Power supply port |
| 103 | charging switch |
| 104 | Control unit |
| 105 | Charging capacitor $C_{out}$ |
| 106 | Ground |
| 107 | Battery connection port |
| 108 | Battery |
| 109 | Current reference value |
| 110 | Voltage reference value |
| 111 | Switched current $I_1$ |
| 112 | Charging current $I_2$ |
| 113 | Charging voltage |
| 114 | Input voltage $V_{in}$ |
| 201 | Battery resistor $R_{batt}$ |
| 202 | Transistor voltage drop $V_{CE}$ |
| 203 | Charging capacitor current $I_3$ |
| 204 | Secondary charging current $I_4$ |
| 205 | Transistor |
| 206 | Battery voltage $V_{Batt}$ |
| 301 | Power dissipated by the transistor |
| 302 | Power dissipated by the input resistor |
| 303 | Total power dissipated |
| 401 | ON-time |
| 402 | Output voltage during ON-time |
| 403 | Output voltage during OFF-time |
| 404 | Minimum output voltage |
| 405 | Average output voltage |
| 406 | Maximum output voltage |
| 407 | OFF time |
| 501 | Instantaneous current |
| 502 | Average current |
| 503 | Transistor voltage drop |
| 504 | Duty ratio |

What is claimed is:

1. Method of charging a rechargeable device, comprising the following steps:
    a) connecting the rechargeable device to a battery connection port and ground;
    b) feeding a current reference value to a control unit;
    c) feeding a voltage reference value to the control unit;
    d) determining a duty cycle in accordance with the current reference value and the voltage reference value fed to the control unit;
    e) switching, using the duty cycle, an output voltage applied to the rechargeable device between a minimum output voltage and a maximum output voltage dependent on the current reference value and the voltage reference value by means of a charging switch; and f) disconnecting the charged rechargeable device;

wherein the method further comprises the following step:

g) connecting an external DC source having an input voltage to an input resistor of a charging apparatus, wherein a transistor voltage drop across the charging switch is minimized in order to reduce a power dissipated by the charging switch-transistor;

h) wherein the duty cycle provided by the control unit is determined by the input voltage and the charging state of the rechargeable device.

2. Method of charging a rechargeable device according to claim 1, wherein a soft switching using the transistor is provided to avoid electromagnetic interference problems.

3. Method of charging a rechargeable device according to claim 1, wherein an average output voltage between the minimum output voltage and the maximum output voltage is applied to the rechargeable device.

4. Method of charging a rechargeable device according to claim 1, wherein charging voltages above a voltage level as specified by battery manufacturers for a specific rechargeable device are avoided.

5. Method of charging a rechargeable device according to claim 1, wherein power dissipated by the input resistor exceeds the power dissipated by the transistor to reduce the power dissipated inside the charging apparatus.

6. Charging apparatus for charging rechargeable device, including:

a) a battery connection port for connecting the rechargeable device to the charging apparatus;

b) a control unit for the determination a duty cycle in accordance with a current reference value and a voltage reference value fed to the control unit; and c) a charging switch for switching according to the duty cycle, an output voltage applied to the rechargeable device between a minimum output voltage and a maximum output voltage dependent on the current reference value and the voltage reference value, wherein the charging apparatus further comprises:

d) an input resistor for connecting an external DC source having an input voltage to the charging apparatus, wherein i) a transistor voltage drop across the charging switch minimized in order to reduce a power dissipated by the charging switch-transistor;

ii) the input resistor is installed separately from the charging apparatus to deposit the power dissipated by the input resistor outside the charging apparatus; and iii) the duty cycle provided by the control unit is determined by the input voltage and the charging state of the rechargeable device.

7. Charging apparatus for charging rechargeable device according to claim 6, wherein the charging switch is a transistor.

8. Charging apparatus for charging a rechargeable device according to claim 6, wherein the charging apparatus is connectable to a commercial AC adapter.

9. Charging apparatus for charging a rechargeable device according to claim 6, wherein the external DC source is a car battery.

* * * * *